UNITED STATES PATENT OFFICE.

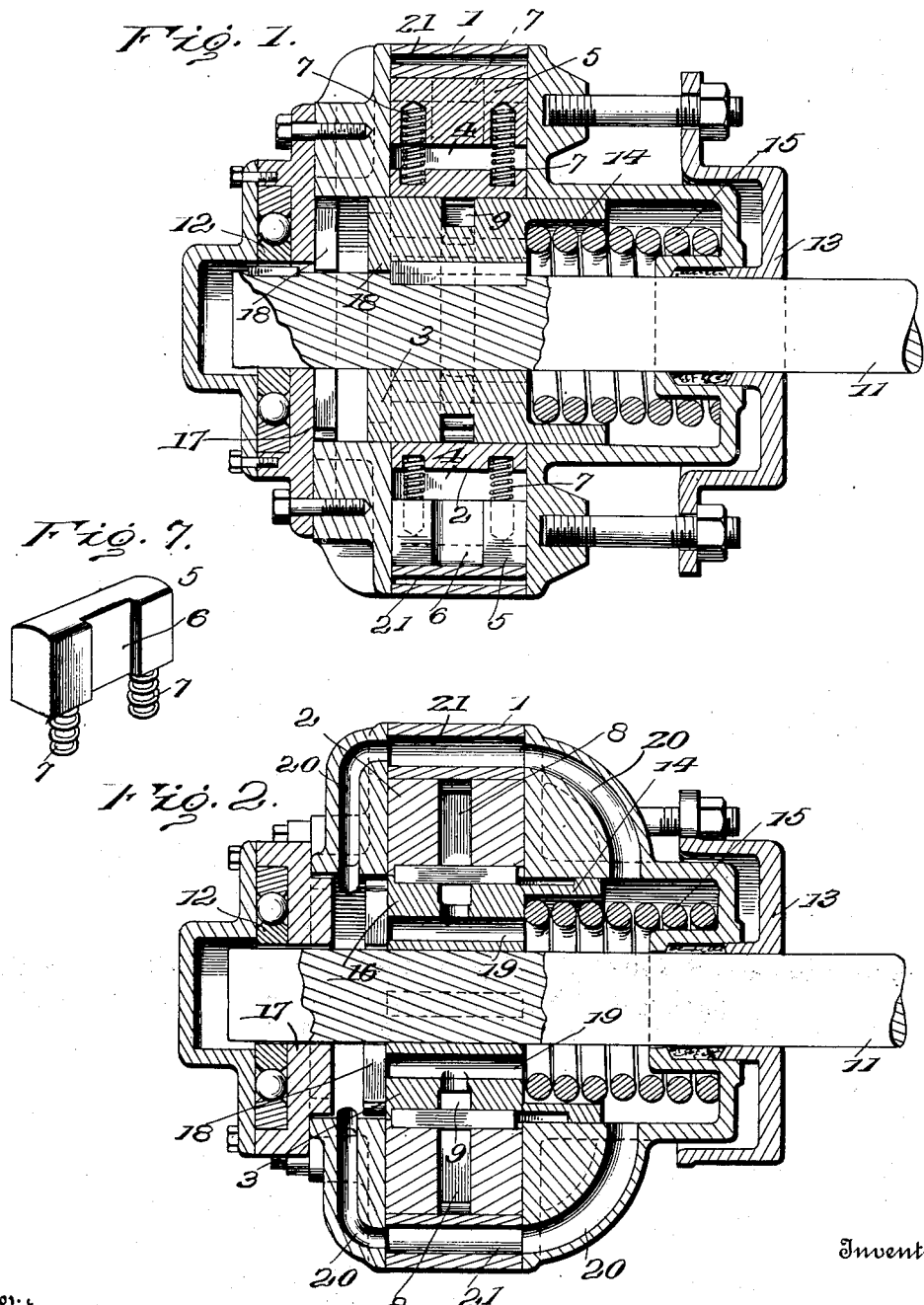

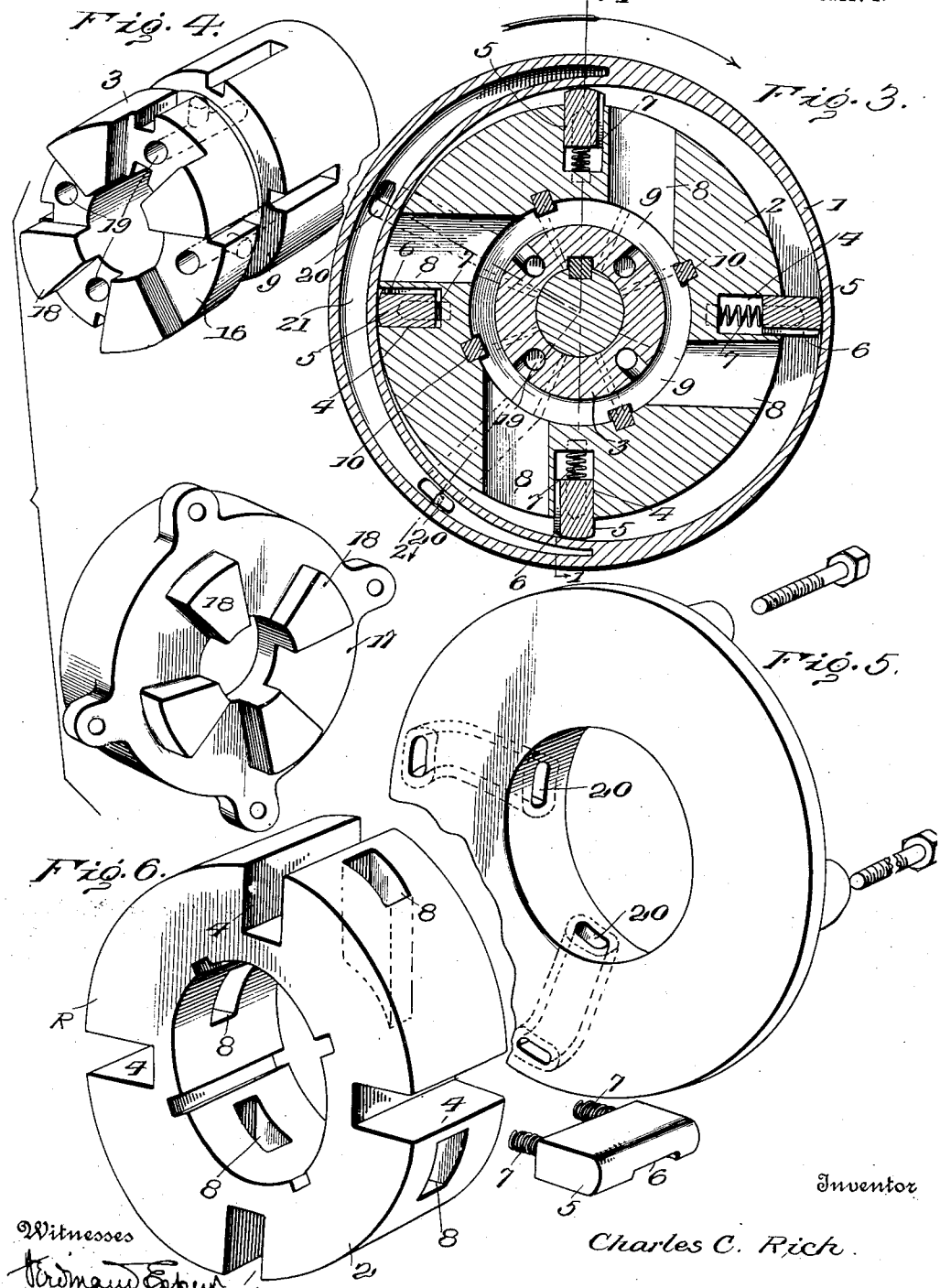

CHARLES CLAYTON RICH, OF MOUNT VERNON, NEW YORK, ASSIGNOR TO THE HYDRO-KINETIC TRANSMISSION COMPANY, A CORPORATION OF MAINE.

CLUTCH.

1,186,132. Specification of Letters Patent. Patented June 6, 1916.

Application filed October 9, 1911. Serial No. 653,682.

*To all whom it may concern:*

Be it known that I, CHARLES CLAYTON RICH, citizen of the United States, residing at Mount Vernon, in the county of Westchester and State of New York, have invented certain new and useful Improvements in Clutches, of which the following is a specification.

This invention comprehends certain new and useful improvements in clutches of the fluid type, and the invention has for its primary object a simple and efficient construction of clutch in which the parts are so arranged that a full release may be secured with a comparatively slight movement of the actuating parts.

The invention also has for one of its main objects an improved fluid pressure clutch which will be compact and strong and particularly adapted for use in connection with the transmission mechanism of automobiles or other motor driven vehicles, the parts being so constructed and arranged that they will occupy, in the vehicle, a minimum amount of space.

The invention also has for one of its objects a clutch of the character specified in which the rotor will be held to revolve about a fixed axis between relatively stationary casing walls, the rotor embodying a hub that is movable therein in a longitudinal direction with the driven shaft to which it is secured, there being a spline or similar connection between the main body of the rotor and its hub and the driven shaft being journaled at one end in the rotor casing, whereby torsional strains will be resisted to the best possible advantage. And the invention also aims to simplify and otherwise generally improve this class of devices and render them more useful and commercially desirable.

With these and other objects in view, the invention consists in certain constructions, arrangements and combinations of the parts that I shall hereinafter fully describe and claim.

For a full understanding of the invention, reference is to be had to the following description and accompanying drawings, in which:

Figure 1 is a longitudinal sectional view on the line 1—1 of Fig. 3 of a fluid pressure clutch embodying the improvements of the present invention; Fig. 2 is an irregularly developed section taken approximately through the planes of the displacement passages so as to clearly show the arrangement of said passages. Fig. 3 is a transverse sectional view of the device, the section line 2 marked upon this figure indicating approximately the planes upon which Fig. 2 is developed. Fig. 4 is a detail perspective view of the hub of the rotor with its jaw, hereinafter specifically described, and the relatively stationary jaw designed to co-act therewith; Fig. 5 is a detail perspective view of one of the heads of the rotor casing; Fig. 6 is a similar view of the body portion of the rotor and one of its gates shown detached therefrom and in juxtaposition thereto, and Fig. 7 is a detail perspective view of one of said gates.

Corresponding and like parts are designated by the same reference characters throughout the several views.

Referring to the drawings, the numeral 1 designates the casing of my improved fluid pressure clutch, said casing containing a rotor R having an annular body portion 2. A hub 3 snugly fits and slides therein. The body portion 2 of the rotor is formed with any desired number of peripheral recesses 4 to receive the radially movable blades 5, said blades in the present instance being formed on their pressure faces with radially disposed recesses 6 extending from their outer to their inner edges to admit the fluid underneath the blades, as will be clearly understood by reference to Fig. 3, one of said blades being illustrated in detail in Fig. 7. Springs 7 are seated in the recesses 4 back of the blades 5, tending to move the blades outwardly against the casing wall.

It is to be particularly noted that the body portion 2 of the rotor is formed with relatively large ports 8 extending therethrough from the outer to the inner wall of said body portion, the present embodiment of the invention employing four of these ports, corresponding to the number of blades used, and said ports being located preferably close to and in advance of the pressure faces of the respective blades, being disposed substantially parallel thereto. The ports 8 are designed to register at their inner ends with a comparatively deep annular channel 9 formed in the hub 3 intermediate the ends of said hub, when the hub is in one position, the hub being movable longitudinally in the casing 1 so as to effect the registry of the ports 8 and channel 9, as well as to partially or wholly cut off the communication between said ports and channel. The hub 3 has a spline or similar connection with the body portion 2 of the rotor, there being four keys or splines in the present instance, as indicated at 10 in Fig. 3. The splines 10 may be secured to the hub and work in grooves in the body portion of the rotor, or secured to the body portion and work in grooves in the hub. The hub 3 is keyed or otherwise rigidly secured to a driven shaft 11, of which it may be considered to form a part, the said shaft being movable longitudinally in the casing 1, and being journaled at one end therein, preferably in a ball bearing, as indicated at 12. The shaft enters the casing through a stuffing box 13, as best illustrated in Figs. 1 and 2.

The hub 3 is formed at one side with a chamber 14 designed to accommodate one end of an expansion actuating spring 15 mounted in the casing and reacting against one end of the latter, the spring exerting its tension against the rotor hub to move the same into its fully operative position. The other side of the hub 3 is formed with or has secured thereto a jaw 16, designed, in one position, to interlock with a comparatively stationary jaw 17 formed on or secured to the adjoining casing head. In the present embodiment of the device, the jaw 16 is formed with lugs 18 designed to slip in between corresponding lugs formed on the jaw 17, it being understood that any desired number and shape of these lugs may be employed, and, in fact, the jaws may be of any desired construction and formation just so long as they are capable of an interlocking engagement when one is moved into contact with the other.

From as much of the description as has preceded, in connection with the accompanying drawings, the operation of my improved fluid pressure clutch will be apparent. When the parts are in the position illustrated in Figs. 1 and 3, it will be understood that the annular channel 9 of the hub 3 of the rotor will register with all of the ports 8. Consequently, the rotary movement of the casing which constitutes a part of the rotary driving member of the device, will not be imparted to the rotor and the driven shaft 11, as there will be an annular race-way around which the fluid medium may freely circulate. In this position of the parts, it will be understood that the spring 15 is compressed. To throw the clutch in, it is only necessary to release the spring 15, whereupon the hub 3 of the rotor, with the driven shaft 11, will be moved longitudinally in a direction (to the left as viewed in Figs. 1 and 2) to carry the channel 9 out of registry with the ports 8, so as to first partially and then wholly cut off communication between the channel and the ports, the liquid then acting against the pressure faces of the blades 5 of the eccentrically mounted rotor, and the movement of the driving element being thereby transmitted to the driven shaft 11, the latter, when the communicaton between the ports 8 and channel 9 has been completely cut off, rotating substantially at the same speed as the casing. In order to relieve the rotor from the strains of the transmission of power after the rotor and its casing have been hydraulically connected, I have provided the jaws 16 and 17, before mentioned, it being understood that the jaw 16 will be moved into interlocking engagement with its mating jaw so as to directly connect the casing 1 with the shaft 11, at one limit of movement of the latter and the rotor hub 3. To release the clutch, a reverse movement of parts is, as is manifest, necessary, this being accomplished in any desired way, as by the ordinary foot pedal or other accessory usually employed in devices of this character. It will be noted that a very slight longitudinal movement of the driven shaft 11 and the rotor hub 3 connected thereto, is sufficient to move the parts from full release to full operative position, and vice versa, this, in connection with the compactness of the structure resulting from the arrangement of parts hereinbefore specified, being a desideratum, particularly when used in connection with automobiles or other motor vehicles. In order to provide for the displacement of the fluid so as to impart sensitiveness to the apparatus and insure ease of operation, I have provided the rotor hub 3 in the present instance with transversely extending displacement passages 19 which intersect the annular channel 9, and for the same purpose the heads of the casing 1 are formed with passages 20, as best illustrated in Figs. 2, 3 and 5, said last-named passages communicating with a circumferentially elongated chamber 21 that is formed in the casing wall. The provision of the chamber 21 not only affords communication between the passages 20 of the respective casing heads, but serves to lighten and balance the casing, it being, of course, understood that the outer wall of the casing is concentric with the driven shaft 11 while the inner wall thereof is eccentric thereto.

While the drawings show what I believe to be the preferred embodiment of the invention, it is to be understood that the invention is not limited thereto and that various changes may be made in the construction, arrangement and proportions of the parts without departing from the scope of the invention as defined in the appended claims.

Having described my invention, what I claim is:

1. A fluid pressure clutch including an outer rotatable casing forming one clutch element, a shaft extending into the casing, a rotor mounted on the shaft and inclosed within the casing, blades on the rotor, said rotor having ports opening into the spaces between said blades, said shaft being longitudinally movable and carrying-means movable longitudinally with the shaft for connecting the several ports to each other to provide for a circulation of motive fluid when the shaft is moved in one direction but disestablishing communication when the shaft is shifted in the other direction to prevent egress of motive fluid from the space between the blades to thereby cause the hydraulic connection of the clutch elements with each other.

2. A fluid pressure clutch including an outer rotatable casing forming one clutch element, a longitudinally movable shaft extending into the casing, a bladed rotor mounted on the shaft and eccentric to the casing to thereby provide a fluid space between the casing and rotor, said rotor having ports extending inward to the center of the rotor, a member mounted upon said shaft for rotation therewith and with the rotor, but longitudinally movable with relation to the rotor and having a peripheral duct adapted when the member is shifted in one direction to establish communication between said ports and when shifted in the other direction to cut off said communication, and means for causing a longitudinal movement of said member to cut off or establish said communication upon a longitudinal movement of the shaft in one or the other direction.

3. A fluid pressure clutch embodying an outer rotary casing forming one clutch element, a shaft extending into the casing and longitudinally movable therein, a bladed rotor mounted on the shaft and disposed eccentric to the casing, said rotor having inwardly extending ports opening into the space between the rotor and the outer casing, a member mounted upon and surrounding the shaft and upon which the rotor is mounted having a peripheral duct adapted in one position of said member to connect the ports with each other and in another position of said member to cut off communication between said ports, clutch teeth carried by the shaft and by the casing, means causing a movement of the said member with the shaft to disconnect the ports of the rotor upon an outward movement of the shaft and a movement of the member to connect said ports upon an inward movement of the shaft, said means permitting further movement of the shaft to bring its clutch teeth into engagement with the clutch-teeth of the casing after communication between said ports has been cut-off and also permitting release of said clutch teeth prior to reëstablishing communication between said ports.

4. In a fluid pressure clutch, an outer rotatable casing forming one clutch element, a shaft extending into the casing and longitudinally movable therein, a bladed rotor surrounding the shaft and disposed in said casing, said rotor being eccentric to the casing and having ports extending inward from the exterior of the rotor to the interior thereof, said ports being in the same plane, a member mounted upon said shaft and having sliding engagement with the rotor but rotating therewith, said member having a circumferential duct adapted in one position of said member to connect all of said ports to each other and in another position of the member to cut off communication with said ports, and means constantly urging the member into the last-named position, the shaft and said member being shiftable against the force of said urging means.

5. A fluid pressure clutch including a casing, a rotor mounted in said casing and comprising a body portion formed with ports and a hub portion mounted centrally in the body portion and formed with a channel adapted to register with the inner ends of said ports, the outer ends of said ports opening at the periphery of the body portion, means tending to move the hub in a direction to carry the channel thereof out of registry with said ports and a shaft mounted in the casing and movable with said hub.

6. A fluid pressure clutch including a casing, a rotor mounted within said casing and comprising a body portion held to rotate about a fixed axis in the casing and a hub held to rotate with said body portion but capable of longitudinal movement therein, the body portion being formed with ports and the hub being formed with an annular channel adapted to register with said ports, a spring within the casing tending to move the hub longitudinally in a direction to carry its channel out of registry with the said ports, and a shaft connected to said hub.

7. A fluid pressure clutch including a casing, a rotor mounted in said casing and comprising a body portion formed with ports and a hub mounted within the body portion and held to turn therewith but capable of a longitudinal movement therein, the hub being formed with a channel adapted to register with said ports, and means for mechanically connecting the hub and the casing upon the movement of the hub in one direction.

8. A fluid pressure clutch including a casing, a rotor mounted in said casing and comprising a body portion formed with ports and a hub adapted to turn with the body portion but capable of a longitudinal movement therein, the hub being formed with a channel adapted to register with said ports, a jaw carried by the hub, and a jaw carried by the casing and arranged for interlocking engagement with the first-named jaw upon the movement of the hub in one direction.

9. A fluid pressure clutch including a casing, a rotor mounted in said casing and comprising a body portion provided with radially movable gates and formed with ports extending therethrough close to and disposed parallel with the pressure faces of said gates, and the hub mounted in the body portion of the rotor and formed with a channel adapted to register with said ports, and means for moving said hub longitudinally in the body portion to carry the channel out of registry with the ports.

10. A fluid pressure clutch including a casing, a rotor mounted therein and comprising a body portion formed with ports and a hub mounted in the body portion and movable longitudinally therein, the hub being formed with a channel adapted to register with said ports and the hub being further formed at one side with a chamber, a shaft to which the hub is connected, and a spring mounted in the casing with one end in said chamber and pressing upon said hub to move the latter in a direction to carry the channel out of registry with the ports.

11. A fluid pressure clutch including a casing, a rotor mounted therein and embodying a hub and a body portion, the latter being formed with ports and the hub being formed with a channel adapted to register with said ports, the hub being movable longitudinally in the body portion and formed with a transversely extending displacement opening intersecting the channel.

12. A fluid pressure clutch including a casing comprising a body portion and a hub portion, a rotor mounted in the body portion of the casing and provided with means for hydraulically connecting the rotor to the casing and for disconnecting it hydraulically therefrom, and a shaft to which said means are connected, the hub portion of the casing being formed with displacement passages and the body portion of the casing being formed with a chamber establishing communication between said passages.

13. A fluid pressure clutch including a rotatable casing, a rotor within the casing and spaced therefrom to inclose a fluid medium between the casing and the rotor, said rotor being formed with ports opening into the space between the rotor and the casing, a longitudinally shiftable shaft within the casing concentric with the rotor, means rigid with said shaft for establishing communication between said ports or cutting off said communication, means actuated by a rotation of the casing relative to the rotor when said ports are so cut-off for compressing the fluid within the casing and thereby hydraulically locking the rotor to the casing, and means for mechanically locking the casing to the shaft after communication between said ports is cut-off and mechanically releasing the casing from the shaft before said communication is established.

In testimony whereof I affix my signature in presence of two witnesses.

CHARLES CLAYTON RICH. [L. S.]

Witnesses:
W. N. WOODSON,
FREDERICK S. STITT.